(12) United States Patent
Kalinin

(10) Patent No.: US 8,001,195 B1
(45) Date of Patent: Aug. 16, 2011

(54) SPAM IDENTIFICATION USING AN ALGORITHM BASED ON HISTOGRAMS AND LEXICAL VECTORS (ONE-PASS ALGORITHM)

(75) Inventor: Andrey L. Kalinin, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 281 days.

(21) Appl. No.: 12/198,568

(22) Filed: Aug. 26, 2008

(51) Int. Cl.
*G06F 15/16* (2006.01)
(52) U.S. Cl. .................. 709/206; 709/203; 709/213
(58) Field of Classification Search .......... 709/206, 709/203, 213
See application file for complete search history.

(56) References Cited

U.S. PATENT DOCUMENTS 7,299,261 B1 * 11/2007 Oliver et al. .................. 709/206
7,555,523 B1 * 6/2009 Hartmann ..................... 709/206

* cited by examiner

*Primary Examiner* — Kyung H Shin
(74) *Attorney, Agent, or Firm* — Bardmesser Law Group

(57) ABSTRACT

A system, method and computer program product for identifying spam in email messages, including (a) identifying unique words and all their variations in the text of the email; (b) filtering noise words from the text; (c) determining how many times each unique word or its morphological variations is found in the text; (d) assigning an identifier to each unique word in the text based on the number of times the unique word is found; (e) creating a lexical vector of the text based on all the identifiers assigned; (f) generating a histogram based on the lexical vector; (g) comparing the histogram against the histograms of lexical vectors corresponding to known spam texts stored in the database; (h) if the histograms coincide within a certain threshold, then the email text is identified as spam.

13 Claims, 6 Drawing Sheets

SPAM IDENTIFICATION USING AN ALGORITHM BASED ON HISTOGRAMS AND LEXICAL VECTORS (ONE-PASS ALGORITHM)

BACKGROUND OF THE INVENTION

1. Field of the Invention

The present invention relates to identification of spam in the text of email messages and, more particularly, to identification of spam in emails using algorithm based on histograms and lexical vectors (one-pass algorithm).

2. Description of the Related Art

Spam emails have become a veritable scourge of modern email systems. It has been estimated that as much as 80-90% of Internet email traffic today is of a spam nature. Spam, in addition to being annoying and wasteful of the time of the recipient, places considerable burden on large email service providers, and on corporate networks. For a 'regular user,' the 'cost' of spam that gets through is the few clicks that it takes to delete the offending message. For large scale email providers, such as Google, Yahoo, Microsoft, as well as for large corporations that have their own server-based solutions for spam filtering, handling spam is a problem that needs to be solved on an industrial scale. For example, such large mail service providers need to filter millions of spam messages every hour.

One phenomenon observed recently is the increasing professionalism of spam generators. Many of the techniques used by spam generators closely mirror, and borrow from, techniques used by professional virus writers. It has been estimated that at any given moment, millions computers connected to the Internet are 'zombified'. In other words, these computers spew out vast numbers of spam emails, even though the owners of these computers are unaware of this.

Although in the early days of the spam 'epidemic,' it was possible to filter spam by looking for certain keywords, such as 'Viagra,' 'Hoodia,' 'free offer' and so on, modern spam has evolved far beyond such simple and easily filterable examples. Also, particularly for large email service providers and corporate email servers, such spam filtering needs to be done more or less on-the-fly, or within at most a few seconds—it would be unacceptable if the spam filters delay receipt of the email by any significant amount of time.

Generally, in the industry, a false positive is regarded as a much greater evil than letting through some number of spam messages, since very often, an email that was falsely identified as spam by the spam filter will never be seen by its intended recipient, or, at best, would be seen much later.

In general, many present methods for spam identification have not been fully successful. For example, attempts to work with filters for sorting out source addresses of bulk email distributors have not been proven successful. The spam filters also require a heavy monitoring burden to keep bulk mailer listings up to date. Similarly sorting out the emails by key words can only be partially successful as new mailers and new messages can avoid or obfuscate the key words.

As mentioned above, a spam cure can be worse than the disease when an intended recipient does not get an important email, because it is incorrectly identified as spam. Accordingly, there is a need in the art for an effective and precise method of identifying spam text in the emails by using a fast and efficient one-pass algorithm.

SUMMARY OF THE INVENTION

Accordingly, the present invention is directed to a method for detection of spam in text of the emails that substantially obviates one or more of the disadvantages of the related art.

In one aspect of the invention, there is provided a system, method and computer program product for identifying spam in the text of the email, including: (a) identifying unique words and their variations in the text of the email; (b) filtering noise words from the text; (c) determining how many times each unique word with its variations is found in the text; (d) assigning an identifier to each unique word in the text based on the number of occurrences of the unique word (or its variation) in the text; (e) creating a lexical vector of the text based on all the identifiers assigned; (f) generating a histogram based on the lexical vector; (g) comparing the histogram against the histograms of lexical vectors corresponding to known spam texts stored in the database; (h) if the histograms coincide within a certain threshold, then the email text is identified as spam.

According to the exemplary embodiment, an identifier is assigned to each unique word with its variations in the text being analyzed for presence of spam. The lexical vector for the text includes all the identifiers of the unique words in the text. Then, a histogram of the lexical vector of the text is compared against the histograms of lexical vectors of known spam texts stored in the database. If the histograms match within a certain threshold, the text is considered to be spam.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
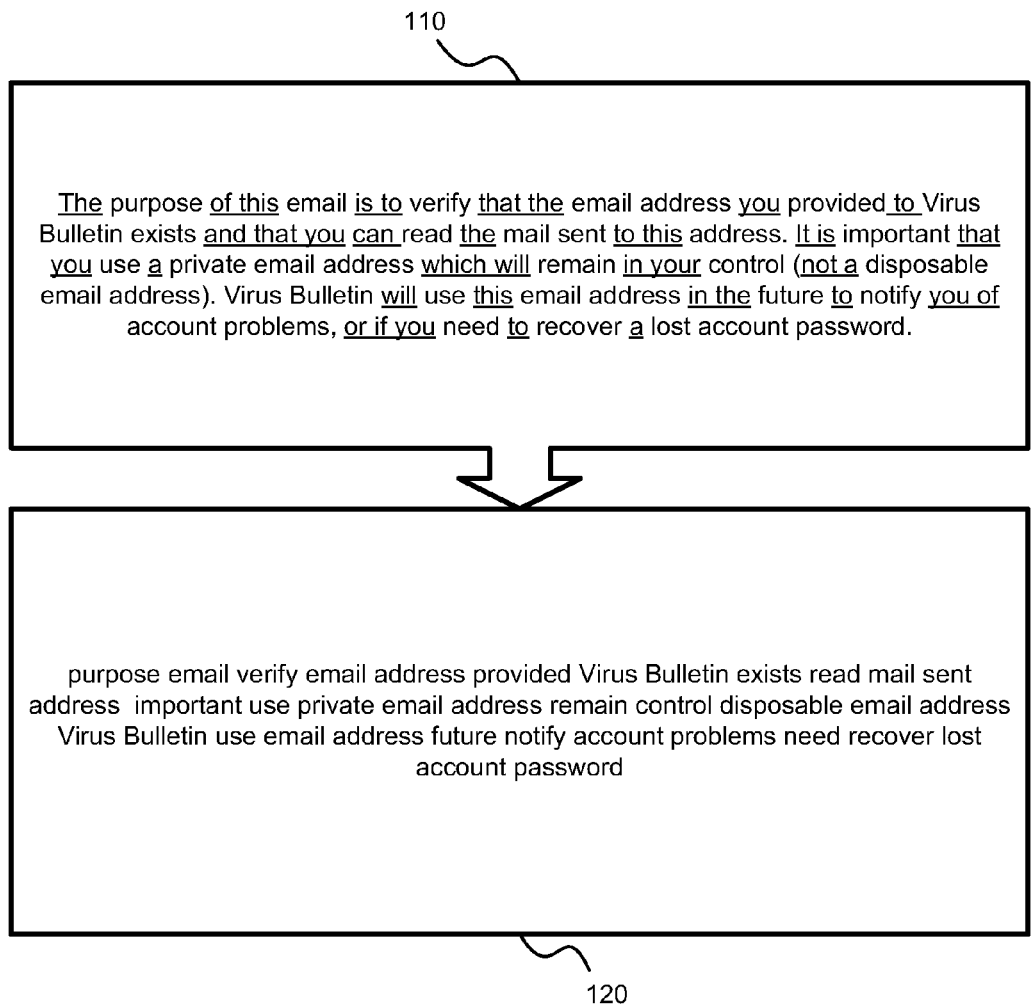
FIG. 1 illustrates filtering of text, in accordance with the exemplary embodiment.

Reference will now be made in detail to the preferred embodiments of the present invention, examples of which are illustrated in the accompanying drawings.

In one embodiment, there is provided a method, system and computer program product for identifying spam in the text of the email by using a one-pass algorithm. The one-pass algorithm employs a lexical vector of the text being analyzed and lexical vectors of the known spam texts stored in a database.

In one exemplary embodiment, a one-pass algorithm for spam identification is provided. According to the one-pass algorithm, unique words and all their variations in the text of the email are identified. The text is normalized morphologically (sometimes this is referred to as 'lemmatization') to identify variations of the same root word ('America', 'American', 'Americanize', etc.) and a number of occurrences of each unique word is determined. Noise words are filtered out. An identifier is assigned to each unique word in the text based on a number of occurrences of the unique word (or its variation) in the text. Then, a lexical vector of the text is created based on all the identifiers assigned to the text. A histogram is generated based on the lexical vector. The histogram of the lexical vector is compared against the histograms of lexical vectors corresponding to known spam texts stored in the database. If the histograms match within a certain threshold range, the text is identified as spam.

A one-pass algorithm, in accordance with the exemplary embodiment, provides a much faster and more efficient method for comparing an incoming email text with the texts of known spam messages stored in the database. For example, an incoming email text containing 100 words needs to be examined for spam content. A database of Ln(k) known spam texts, containing k words each, is used (for example, Ln=200 texts and k=300 words). If a spam filter needs to compare an initial text with each text in the database, it will have to compare all 100 words of the initial texts with the words in the texts stored in the database. In other words, the initial text will have to be passed through 200 times and 100*Ln(k) comparisons will have to be made. In this example, 100*200*300=6, 000 000 comparisons will need to be made in order to find out if the email text coincides with texts of known spam messages stored in a database.

A proposed one-pass algorithm, in this example, compares 100 words against all the words found in the spam texts stored in the database. Thus, Ln(k)<10 and a number of comparisons needed will equal 100*Ln(k). Therefore, a one-pass algorithm provides a very significant optimization of comparison process.

According to the exemplary embodiment, an identifier ID(N), where N is a number of occurrences of a unique word (or its variation) in the text, is generated for all the unique words with their variations in the incoming email text being analyzed for presence of spam. The lexical vector for the text is formed. The lexical vector includes all the identifiers of the unique words (or their morphological variations) in the text. Then, a histogram of the lexical vector of the text is generated and compared against the histograms of lexical vectors of known spam texts stored in the database. If the histograms coincide within a certain threshold range, the text is considered to be spam.

A one-pass algorithm, in accordance with the exemplary embodiment, employs lexical vectors in the following manner. An initial text of the email is filtered—i.e., all frequently used meaningless words (such, as for example, articles, prefixes, various forms of verbs 'do,' 'have,' 'to be,' etc.) are taken out from the text. Filtering of a text is illustrated in FIG. 1. The initial text 110 is filtered by exclusion of all underlined words and the filtered text 120 is produced.

Figure 2:
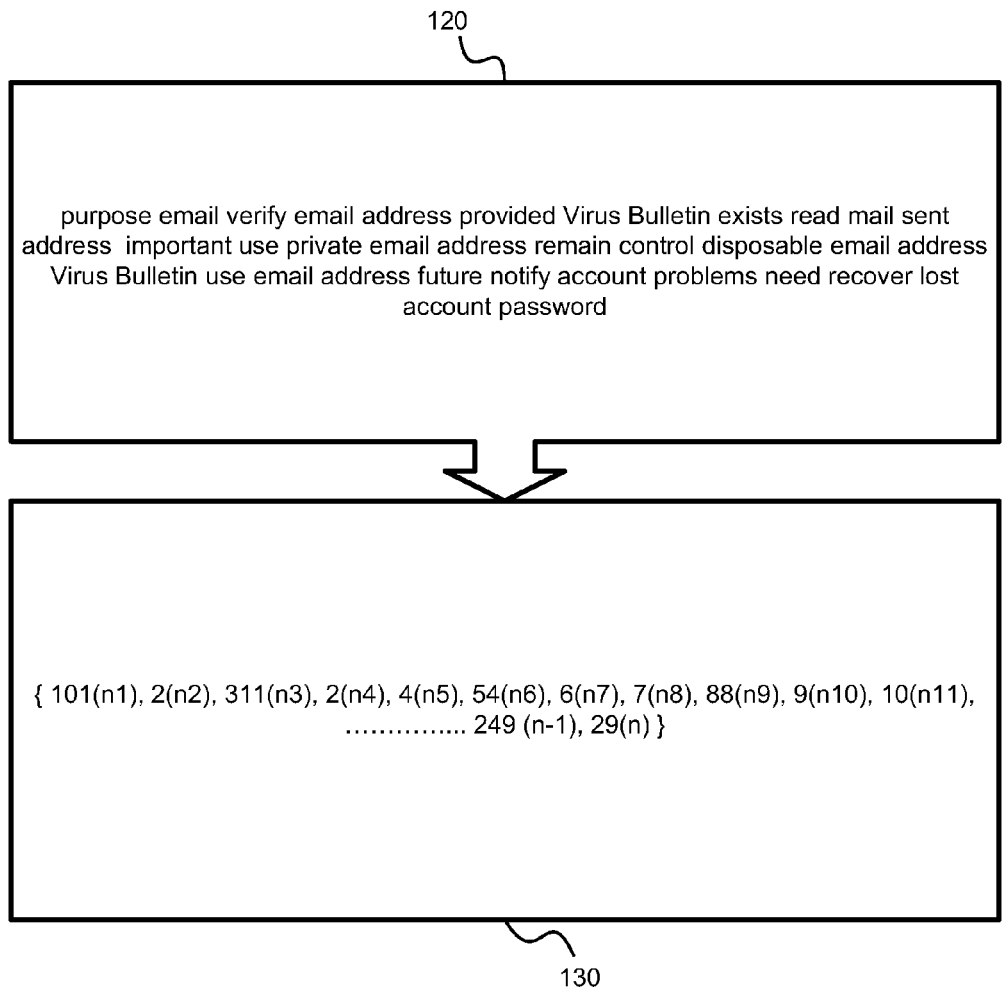
FIG. 2 illustrates assigning identifiers to unique words of the text, in accordance with the exemplary embodiment.

In the text 120, each unique word including its variations is replaced with a unique numerical identifier ID(N) as shown in FIG. 2. In the exemplary embodiment, a special database containing the numerical values corresponding to unique words is used. The identifier ID(N) is based on a numerical value corresponding to a particular word and on a number of occurrences of a corresponding word in the text—N. For example, if the word 'apple' is assigned numerical value $ID_1$ and it occurs in the text five times, then the actual identifier for this word is $ID_1$ (5). Then lexical vector 130 of the text 120 can be formed as a plurality of identifiers ID(N) of all the unique words in the text 120. In general, the lexical vector of the text will be:

$$LEXV=\{ID_1(N_1), ID_2(N_2), ID_3(N_3), \ldots ID_n(N_n)\}.$$

A database of know spam has N lexical vectors ($LEXV_1$, $LEXV_2$, $LEXV_3$, ... $LEXV_N$) corresponding to different known spam texts. In the exemplary embodiment, histograms of lexical vectors are used for comparing the lexical vectors. For each identifier of a word of the email text, a histogram HIST [1 ... N] is generated. For each identifier of a word in the email text, the lexical vectors of the texts containing the same word identifier are found in the database.

Figure 3:
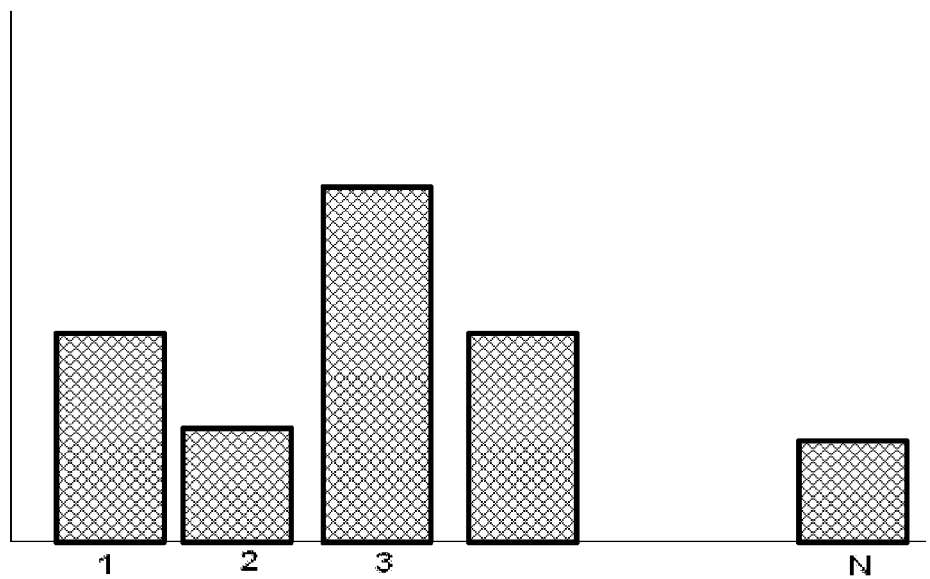
FIG. 3 illustrates a histogram of the text, in accordance with the exemplary embodiment.

For example, if in a text lexical vector $LEXV_M$, a word identifier $ID_1(N_1)$ is found $M_1$ times. Initially the elements of the histogram are filled with zeros, and then, a corresponding element of a histogram HIST[M] is populated (i.e., increased) as follows:

$$HIST[M]=HIST[M]+(N_1*M_1)^k,$$

where $N_1$ is a number of word identifiers $ID_1(N_1)$ found in the lexical vector of the initial email text LEXV, and k is a correction coefficient. An exemplary histogram generated by this method is depicted in FIG. 3, illustrating the histograms generated for various word identifiers.

For example, the word 'apple' is found 5 times in the email text lexical vector LEXV. This word is also found 3 times in the text lexical vector $LEXV_2$, and it is also found 4 times in the text lexical vector $LEXV_9$. Then, the following element of the histogram will be increased as follows:

$$HIST[2]=HIST[2]+(5*3)^k$$

$$HIST[9]=HIST[9]+(5*4)^k$$

As a result, a histogram depicted in FIG. 3 can be generated. Then, a length of a text lexical vector LEXV as well as lengths of lexical vectors ($LEXV_1$, $LEXV_2$, $LEXV_3$, ... $LEXV_N$) are calculated. According to the exemplary embodiments, the length of lexical vectors can be calculated in two ways. In one embodiment, the length $LEN_1$ is calculated as a number of unique world identifiers in the text lexical vector. For example, if the vector LEXV has 15 unique word identifiers, its length will be $LEN_1(LEXV)=15$.

In another embodiment, the length $LEN_2$ of the lexical vector is calculated as a number of all unique words including a number of their occurrences in the lexical vector of the text. For example, the text lexical vector LEXV has 5 unique words, and some words occur once, while first and fourth words are found in the text 6 and 7 times, respectively. Then, the length of the text lexical vector will be $LEN_2(LEXV)=6+1+1+7+1=16$.

According to the exemplary embodiment, the length of the email text lexical vector LEXV is compared with the length of each spam text lexical vectors ($LEXV_1$, $LEXV_2$, $LEXV_3$, ... $LEXV_N$) stored in a lexical vector database. Then, if the difference in lengths $LEN_1$ ($LEXV_M$)−$LEN_1$ (LEXV) is not within a pre-set threshold, the vector $LEXV_N$ is excluded from further consideration.

A method for comparing the lengths of the lexical vectors in the exemplary embodiment can be formulated as follows:

$$2*(LEN_1(LEXV_M)-LEN_1(LEXV))/(LEN_1(LEXV_M)+LEN_1(LEXV))$$

The same comparison method can be used for $LEN_2$. Then, at the last phase of identifying spam in the email text, a control value CV representing comparison of histogram of the email text being analyzed against the histograms of lexical vectors of known spam text stored in the lexical vector database, is calculated. The control value $CV_M$ for element M of the histogram is calculated as follows:

$$CV_M = \frac{HIST[M]}{\sqrt{SUM(LEXV_M) * SUM(LEXV)}},$$

where HIST[M] is a value of the histogram for element M calculated as discussed above:

$$HIST[M] = HIST[M] + (N_1 * M_1)^k$$

where $N_1$ is a number of word identifiers $ID_1(N_1)$ found in the lexical vector of the initial email text LEXV, and k is correction coefficient.

The value of a sum of a lexical vector is calculated using all identifiers of the lexical vector, as follows:

$$SUM(LEXV) = \Sigma(N_i)^{2k}$$

where $N_i$ is a number of occurrences of the identifier $ID_i$ in the lexical vector LEXV of the email text being analyzed. The correcting coefficient k is determined empirically. In the exemplary embodiment it is set at 0.2. The coefficient k can be set as other values, as it is needed for leveling out a frequency of occurrence of certain words. The optimal range for coefficient k is 0.2-0.25. For example, if the word 'Viagra' occurs in the text in an order of hundreds of times, coefficient k levels out the effect of this word on the calculated control value $CV_M$.

Then the calculated control value $CV_M$ is compared to a pre-set threshold value range of [0.1:1]. In other words, it is considered that a lexical vector of known spam text $LEXV_M$ coincides with the lexical vector of the email text LEXV, and, therefore, the email text corresponding to LEXV is spam.

For example, LEXV is comprised of three identifiers corresponding to unique words 'apple', 'Viagra' and 'rocket'. The word 'apple' is assigned a numerical value 87 and occurs 5 times. The word 'Viagra' is assigned a numerical value 15 and occurs 10 times. The word 'rocket' is assigned a numerical value 123 and occurs 3 times.

Then, LEXV={87(5); 15(10); 123(3)} and the sum of this lexical vector can be calculated as follows:

$$SUM = 5^{\frac{2}{5}} + 10^{\frac{2}{5}} + 3^{\frac{2}{5}} = 5.97.$$

It will be appreciated by those skilled in the art, that a various levels of precision of identification of spam by using the one-pass algorithm can be achieved by changing the range of the threshold value. For example, a threshold value range can be set at [0.5:1], therefore increasing a degree of coincidence between the email text and known spam texts when the algorithm can determine that the email text is spam.

Figure 4:
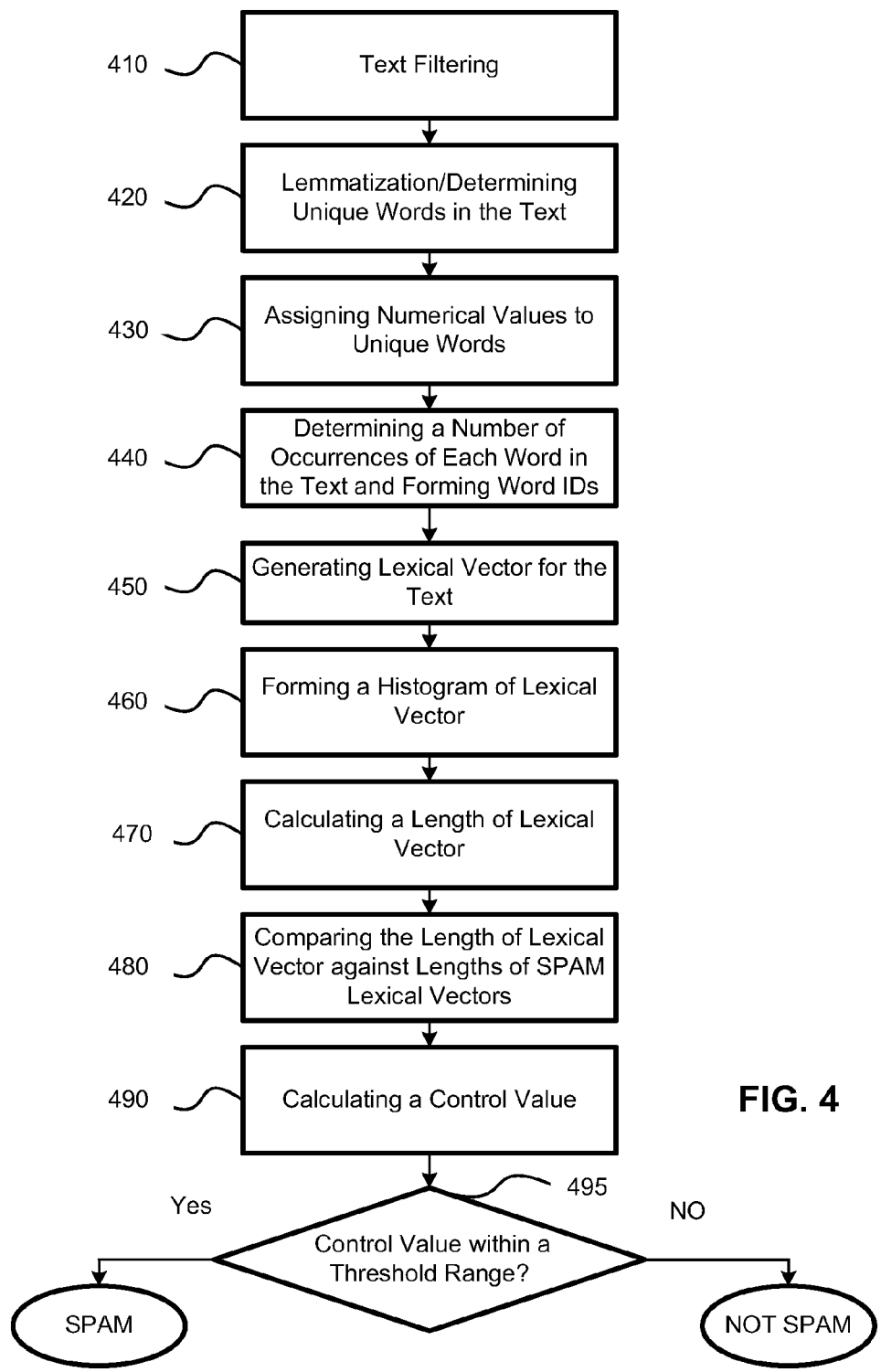
FIG. 4 illustrates a flow chart of a spam identification method, in accordance with the exemplary embodiment.

A flow chart of a spam identification method in accordance with the exemplary embodiment is illustrated in FIG. 4. The email text is filtered at step 410. The unique words with their variations in the text are determined at step 420. Numerical values are assigned to each of the unique words (and variations of these words) at step 430. Then, a number of occurrences of each unique word in the text is determined, and the identifiers are generated at step 440. A lexical vector for the text is generated based on the identifiers at step 450. Then, a histogram of the lexical vector is populated using the lexical vectors of known spam texts stored in the lexical vector database at step 460.

At step 470, a length of the lexical vector is calculated. Then, the length of the lexical vector calculated at step 470 is compared against the lengths of lexical vectors of known spam texts stored in the lexical vector database (see step 480). Then, if the difference in length of one of lexical vectors of spam texts from the database and the length of the lexical vector of the email text being analyzed is outside a pre-set threshold range, this lexical vector of known spam text is excluded from further consideration.

A control value, representing comparison of histogram of the lexical vector of the email text being analyzed against the histograms of lexical vectors of known spam texts stored in the lexical vector database, is calculated at step 490. Then, at step 495, if the control value, calculated at step 490, is within a pre-set threshold range, the text of the email is considered to be spam. Otherwise the email message is not spam.

Figure 5:
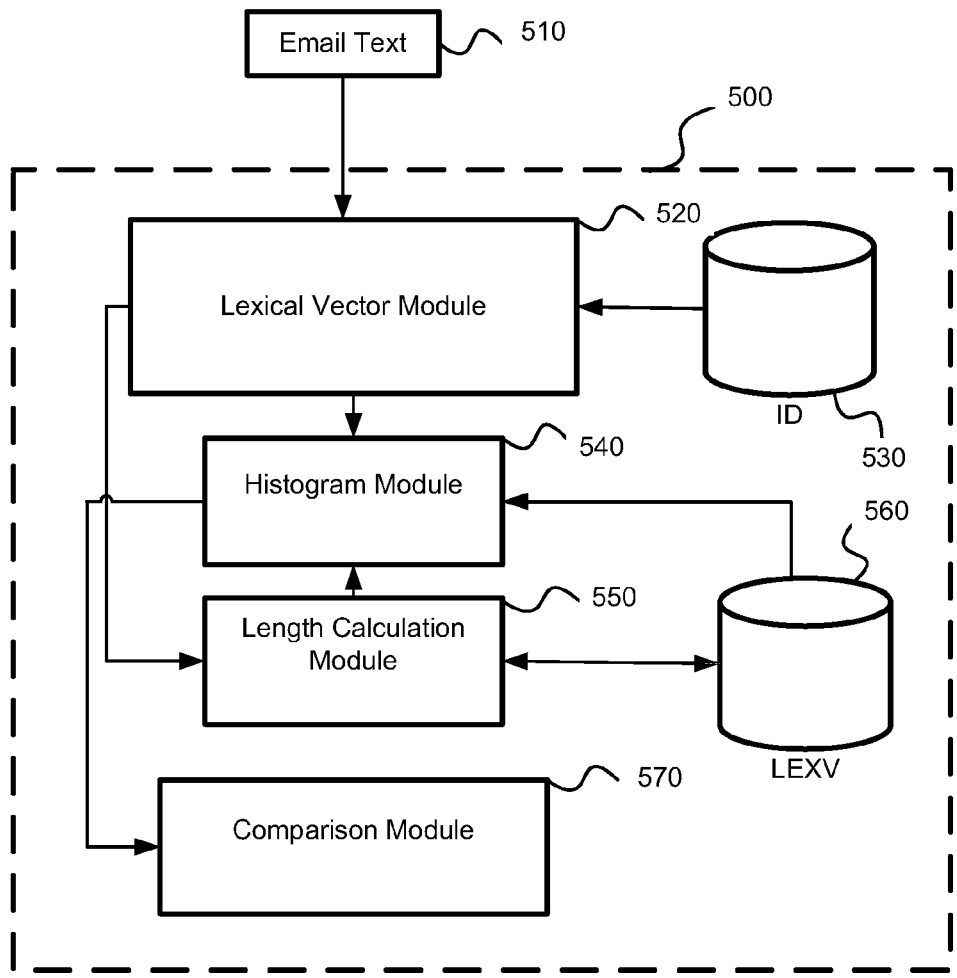
FIG. 5 illustrates a system for spam identification, in accordance with the exemplary embodiment.

An exemplary system for spam identification is illustrated in FIG. 5. A spam identification system 500 operates in the following manner. An email text 510 is received at spam identification system 500. The text 510 is passed on to a lexical vector module 520, where filtering of the text 510 is performed and numerical values from the database 530 are assigned to the unique words in the text. Then, based on a number of occurrences of each word in the text, an ID(N) is generated. A lexical vector of the text 510 is formed based on all the ID(N)s generated for this text.

The lexical vector of the text 510 is passed on to a histogram module 540, where a histogram of the lexical vector is generated. Note that a histogram is a visualization technique for representing an array of data, and, as used in this context, an actual visual representation is not required, all that is required is that the data be arranged in an array. The histogram of the lexical vector of the text 510 is also sent to a comparison module 570. The lexical vector of the text 510 is also passed to a length calculation module 550, where its length is calculated. The lengths of lexical vectors if known spam texts stored in the lexical vector database 560 are also calculated at the length calculation module 550.

Then vector lengths are compared and the lexical vectors of known spam texts, having length coincident (within a certain threshold range) to the length of the lexical vector of the text 510, are determined. These lexical vectors are acquired by the histogram module 540, where histograms of these lexical vectors are generated.

Then, the histograms of the lexical vectors acquired from the lexical vector database 560 are passed on to a comparison module 570, where they are compared against the histogram of the lexical vector of the text 510. Based on a result of histogram comparison performed in module 570, it is determined whether the text 510 is spam message.

Those skilled in the art will appreciate that proposed system and method for identifying spam in the email messages, based on one-pass algorithm and lexical vectors of the text, provides for a very efficient and precise spam identification. Thus, the proposed system overcomes the disadvantages of the prior spam filtering systems.

Figure 6:
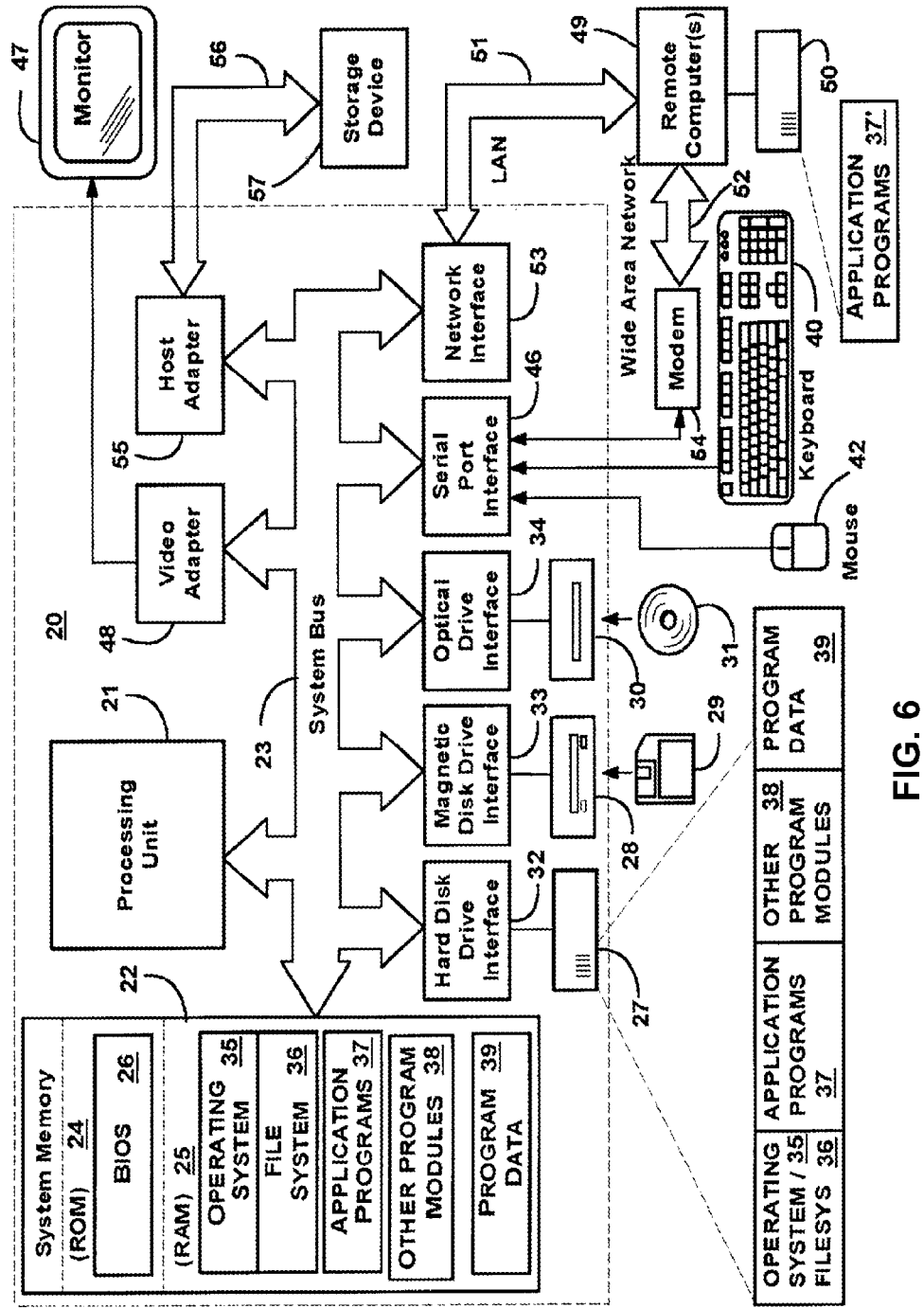
FIG. 6 illustrates an exemplary computer system on which the invention may be implemented.

With reference to FIG. 6, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the computer 20, or portions thereof, may be stored in the remote memory storage device. It will be appreciated that the network connections shown are exemplary and other means of establishing a communications link between the computers may be used. Such computers as described above can be used in conventional networks, such as the Internet, local area networks, regional networks, wide area networks, and so forth. These networks can link various resources, such as user computers, servers, Internet service providers, telephones connected to the network, and so on.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A method for identifying spam in an email, the method comprising:
   (a) normalizing an email text morphologically and identifying unique words in the email text;
   (b) filtering words from the email text, including filtering multi-symbol meaningless human-language words and noise human-language words;
   (c) determining a number of occurrences of each unique word in the email text;
   (d) creating a unique numerical identifier for each unique word, the identifier being based on a numerical value corresponding to the unique word;
   (e) assigning an unique numerical identifier to each unique word in the email text;
   (f) generating a lexical vector of the email text as a plurality of the assigned identifiers and a frequency of occurrence of each corresponding unique word in the email text;
   (g) generating a histogram of the lexical vector for each unique numerical identifier of each corresponding unique word in the email text;
   (h) performing only a single comparison of the histogram of the lexical vector to histograms of lexical vectors of known spam texts; and
   (i) determining if the email text is spam based on a result of comparison of the histograms.

2. The method of claim 1, further comprising calculating a length of the lexical vector and comparing it to lengths of the lexical vectors of the known spam texts prior to comparing the histograms.

3. The method of claim 2, further comprising excluding from consideration the lexical vectors of the known spam texts having a length that does not coincide with the length of the lexical vector within a pre-determined threshold range.

4. The method of claim 3, further comprising generating the histograms of the lexical vectors of known spam texts that remain after comparison of the lengths.

5. The method of claim 1, wherein the result of comparison of the histograms is a control value.

6. The method of claim 5, wherein the email text is considered to be spam if the control value is within the pre-set threshold range.

7. The method of claim 1, wherein the numerical values corresponding to the unique words are stored in a database.

8. The method of claim 1, wherein the lexical vectors of the known spam texts are stored in a lexical vector database.

9. A system for identifying spam in an email text, the system comprising:
   a processor;
   a memory; and
   computer code stored in the memory and executed on the processor for implementing the steps (a)-(i) of claim 1.

10. A system for identifying spam in an email text, the system comprising a processor, a memory, and computer code loaded into the memory for implementing:
   (a) a lexical vector module coupled to a database containing numerical values corresponding to unique words of the email text, the lexical vector module being configured to generate a lexical vector of the email text as a plurality of the unique numerical values corresponding to a unique word and a number of occurrences of each corresponding unique word in the email text;
   (b) a histogram module for generating histograms of lexical vectors for each unique numerical identifier of each corresponding unique word in the email text;
   (c) a lexical vector database accessible by the histogram module;
   (d) a length calculation module coupled to the lexical vector module and connected to the lexical vector database; and
   (e) a comparison nodule coupled to the histogram module,
   (f) wherein the histogram of the lexical vector of the incoming email text is generated in the histogram module and compared only a single time to histograms of lexical vectors of known spam texts stored in the lexical vector database, and
   (g) wherein the lexical vector is generated after the email text is normalized morphologically and after meaningless and noise words are filtered out from the email text, filtering multi-symbol meaningless human-language words and noise human-language words.

11. The system of claim 10, wherein the length of the lexical vector of the incoming email text is compared to lengths of the lexical vectors of known spam texts stored in the lexical vector database in the length calculation module.

12. The system of claim 10, wherein the comparison module produces a control value.

13. The system of claim 12, wherein if the control value is within a pre-set threshold, the incoming email text is considered to be spam.

* * * * *